(12) United States Patent
Akiyama

(10) Patent No.: US 11,460,762 B2
(45) Date of Patent: Oct. 4, 2022

(54) PROJECTOR WITH LIGHT MODULATOR

(71) Applicant: SEIKO EPSON CORPORATION, Tokyo (JP)

(72) Inventor: Koichi Akiyama, Azumino (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/104,699

(22) Filed: Nov. 25, 2020

(65) Prior Publication Data

US 2021/0165313 A1 Jun. 3, 2021

(30) Foreign Application Priority Data

Nov. 28, 2019 (JP) .............................. JP2019-215064

(51) Int. Cl.
| | |
|---|---|
| *G02B 27/28* | (2006.01) |
| *G02B 5/02* | (2006.01) |
| *G02B 27/10* | (2006.01) |
| *G03B 21/20* | (2006.01) |
| *G02B 5/10* | (2006.01) |

(52) U.S. Cl.
CPC ........... *G03B 21/2013* (2013.01); *G02B 5/02* (2013.01); *G02B 27/102* (2013.01); *G02B 27/283* (2013.01); *G02B 27/286* (2013.01); *G03B 21/2066* (2013.01); *G03B 21/2073* (2013.01); *G02B 5/10* (2013.01)

(58) Field of Classification Search
CPC .. G02B 27/102; G02B 27/283; G02B 27/286; G02B 5/02; G02B 5/10; G03B 21/005; G03B 21/2013; G03B 21/204; G03B 21/2066; G03B 21/2073
See application file for complete search history.

(56) References Cited

U.S. PATENT DOCUMENTS

| | | | | |
|---|---|---|---|---|
| 9,918,055 | B2 * | 3/2018 | Sakata | G02B 27/283 |
| 10,295,892 | B2 * | 5/2019 | Ito | G03B 21/208 |
| 10,359,691 | B2 * | 7/2019 | Egawa | G02B 7/028 |
| 10,444,611 | B2 * | 10/2019 | Pan | G03B 33/06 |
| 10,474,022 | B2 * | 11/2019 | Kashiwagi | G02B 27/1053 |
| 2005/0174495 | A1 * | 8/2005 | Itoh | G03B 21/2066 348/758 |
| 2012/0140183 | A1 | 6/2012 | Tanaka et al. | |
| 2018/0052345 | A1 * | 2/2018 | Otani | G03B 21/145 |

(Continued)

FOREIGN PATENT DOCUMENTS

JP   2012-137744   7/2012

*Primary Examiner* — Magda Cruz
(74) *Attorney, Agent, or Firm* — Dority & Manning, P.A.

(57) ABSTRACT

A projector includes a first light source, a first light modulator on which first light is incident, a first polarization separator disposed on a first optical path along which the first light emitted from the first light source and entering the first light modulator travels, a first retardation film disposed on the first optical path, a first reflector disposed on the first optical path, and a second light modulator on which second light different from the first light is incident. The first optical path passes through the first polarization separator and the first retardation film, is then deflected back by the first reflector, and reaches the first light modulator via the first retardation film and the first polarization separator. A second optical path along which the second light travels is independent of the first optical path and does not intersect the first optical path.

8 Claims, 10 Drawing Sheets

(56) References Cited

U.S. PATENT DOCUMENTS

| | | | |
|---|---|---|---|
| 2018/0066828 A1* | 3/2018 | Akiyama | H04N 9/3194 |
| 2018/0088453 A1* | 3/2018 | Yasumatsu | G03B 21/2073 |
| 2019/0391477 A1* | 12/2019 | Akiyama | G03B 21/2066 |

* cited by examiner

PROJECTOR WITH LIGHT MODULATOR

The present application is based on, and claims priority from JP Application Serial Number 2019-215064, filed Nov. 28, 2019, the disclosure of which is hereby incorporated by reference herein in its entirety.

BACKGROUND

1. Technical Field

The present disclosure relates to a projector.

2. Related Art

As alight source apparatus used in a projector, alight source apparatus using fluorescence emitted from a phosphor when the phosphor is irradiated with excitation light outputted from a solid-state light source is proposed, for example, in JP-A-2012-137744. Such a light source apparatus for a projector uses a polarization separator for separating blue light outputted from the solid-state light source into excitation light and image display light.

In general, to separate light from a solid-state light source into excitation light and image display light, the power of the solid-state light source needs to be increased. When the power of the solid-state light source is increased as described above, an optical element on which the light from the solid-state light source is incident is thermally distorted, so that the polarization state of the light outputted from the solid-state light source is disturbed, undesirably resulting in a possibility of a change in the state of the separation of the excitation light and the image display light. To avoid the undesirable possibility, it is conceivable to configure the optical path of the image display light to be independent of the optical path of the excitation light. When the optical path of the image display light is independent of the optical path of the excitation light, however, it is necessary to separately provide a light source apparatus that produces the image display light, resulting in another problem of an increase in the size of the projector itself.

SUMMARY

To solve the problems described above, a projector according to an aspect of the present disclosure includes a first light source, a first light modulator on which first light is incident, a first polarization separator disposed on a first optical path along which the first light emitted from the first light source and entering the first light modulator travels, a first retardation film disposed on the first optical path, a first reflector disposed on the first optical path, and a second light modulator on which second light different from the first light is incident. The first optical path passes through the first polarization separator and the first retardation film, is then deflected back by the first reflector, and reaches the first light modulator via the first retardation film and the first polarization separator. A second optical path along which the second light travels is independent of the first optical path and does not intersect the first optical path.

The projector may further include a second retardation film disposed on the first optical path and a second reflector disposed on the first optical path. On a downstream of the first retardation film and the first polarization separator, the first optical path may pass through the second retardation film, may then be deflected back again by the second reflector, and may reach the first light modulator via the second retardation film and the first polarization separator.

The projector may further include an afocal system configured to reduce a light flux diameter of light emitted from the first light source. The afocal system may include a first lens and a second lens which are disposed on the first optical path. The first polarization separator, the first retardation film, and the first reflector may be disposed on the first optical path between the first lens and the second lens.

The projector may further include an afocal system configured to reduce a light flux diameter of light emitted from the first light source. The afocal system may include a first lens and a second lens which are disposed on the first optical path. The first polarization separator, the first retardation film, the first reflector, the second retardation film, and the second reflector may be disposed on the first optical path between the first lens and the second lens.

The projector may further include a second light source, a wavelength converter that is excited with excitation light emitted from the second light source to produce wavelength-converted light, a color separator configured to separate the wavelength-converted light emitted from the wavelength converter into the second light and third light, and a third light modulator on which the third light is incident. The second light separated from the wavelength-converted light may travel via the second optical path and may be incident on the second light modulator. The third light separated from the wavelength-converted light may be incident on the third light modulator.

The projector may further include a second light source, a second polarization separator disposed on the second optical path along which the second light emitted from the second light source and entering the second light modulator travels, a third retardation film disposed on the second optical path, a third reflector disposed on the second optical path, a third light source, a third light modulator on which third light different from the first light and the second light is incident, a third polarization separator disposed on a third optical path along which the third light emitted from the third light source and entering the third light modulator travels, a fourth retardation film disposed on the third optical path, and a fourth reflector disposed on the third optical path. The second optical path may pass through the second polarization separator and the third retardation film, may then be deflected back by the third reflector, and may reach the second light modulator via the third retardation film and the second polarization separator. The third optical path may pass through the third polarization separator and the fourth retardation film, may then be deflected back by the fourth reflector, and may reach the third light modulator via the fourth retardation film and the third polarization separator. The third optical path may be independent of the second optical path and may not intersect the second optical path.

The first reflector may be a concave mirror. A concave surface of the concave mirror may be an aspheric surface.

DESCRIPTION OF EXEMPLARY EMBODIMENTS

First Embodiment

A first embodiment of the present disclosure will be described below with reference to the drawings.

In the following drawings, components are drawn at different dimensional scales in some cases for clarity of each of the components.

An example of a projector according to the present embodiment will be described.

Figure 1:
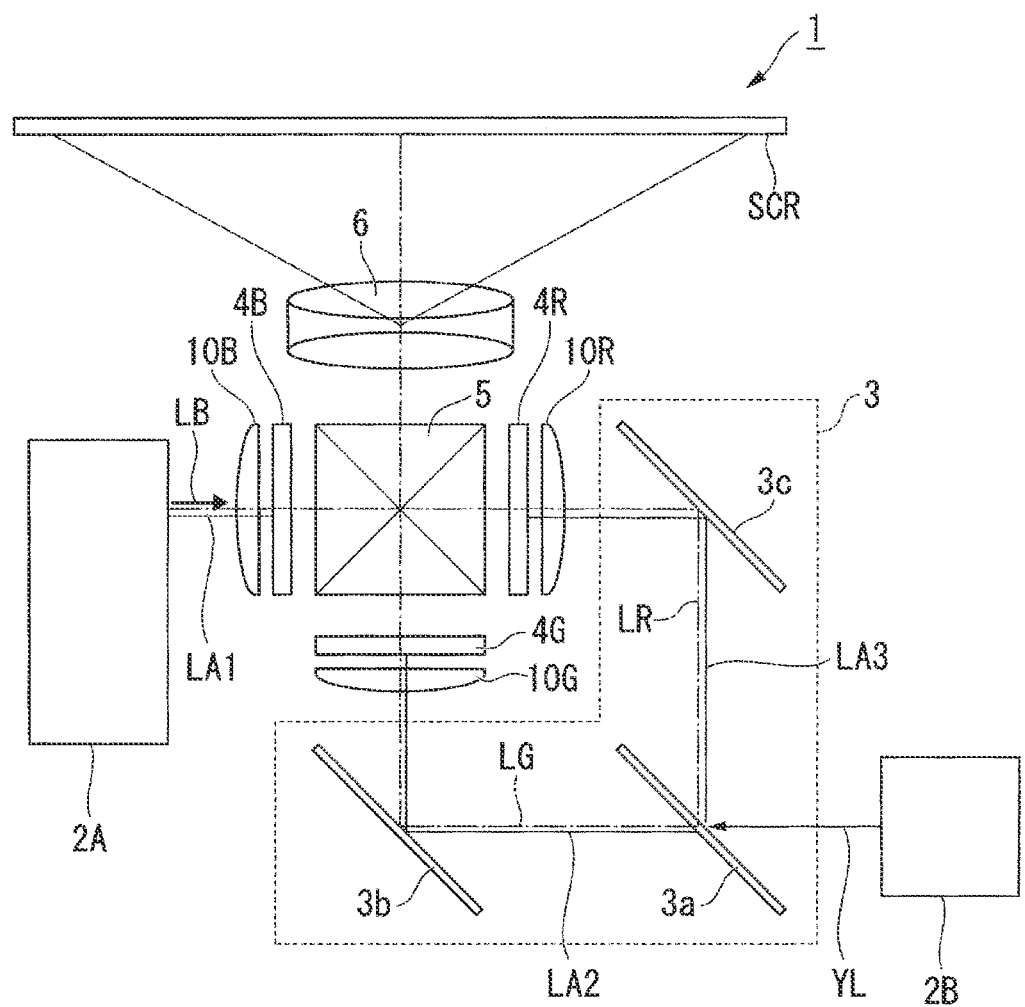
FIG. 1 shows a schematic configuration of a projector according to a first embodiment.

FIG. 1 shows a schematic configuration of the projector according to the present embodiment.

A projector 1 according to the present embodiment is a projection-type image display apparatus that displays color video images on a screen SCR, as shown in FIG. 1. The projector 1 includes a first illuminator 2A, a second illuminator 2B, a color separation system 3, a light modulator 4R, a light modulator 4G, a light modulator 4B, a light combining system 5, and a projection optical apparatus 6. The configurations of the first illuminator 2A and the second illuminator 2B will be described later.

The first illuminator 2A outputs blue light LB. The blue light LB outputted from the first illuminator 2A is substantially parallelized by a field lens 10B and incident on the light modulator (first light modulator) 4B.

The color separation system 3 includes a dichroic mirror (color separator) 3a, a reflection mirror 3b, and a reflection mirror 3c.

The second illuminator 2B outputs yellow fluorescence YL. The fluorescence YL outputted from the second illuminator 2B is separated by the color separation system 3 into green light LG and red light LR. The color separation system 3 guides the green light LG separated from the fluorescence YL to the light modulator 4G and the red light LR separated from the fluorescence YL to the light modulator 4R.

The dichroic mirror 3a transmits the green light component and reflects the red light component. That is, the dichroic mirror 3a separates the fluorescence YL outputted from the second illuminator 2B into the green light (second light) LG and the red light (third light) LR.

The green light LG having passed through the dichroic mirror 3a is reflected off the reflection mirror 3b, passes through a field lens 10G, and is incident on an image formation area of the light modulator 4G for green light. The red light LR reflected off the dichroic mirror 3a travels via the reflection mirror 3c and a field lens 10R and is incident on the image formation area of the light modulator 4R for red light.

The light modulators 4R, 4G, and 4B each modulate the color light incident thereon in accordance with image information to form an image light flux. The light modulators 4R, 4G, and 4B are each formed of a liquid crystal light valve.

Although not shown, a light-incident-side polarizer is disposed on the light incident side of each of the light modulators 4R, 4G, and 4B. A light-exiting-side polarizer is disposed on the light exiting side of each of the light modulators 4R, 4G, and 4B.

The light combining system 5 combines the image light fluxes outputted from the light modulators 4R, 4G, and 4B with one another to form full-color image light. The light combining system 5 is formed of a cross dichroic prism formed of four right angled prisms so bonded to each other to form a substantially square shape in the plan view. Dielectric multilayer films are formed along the substantially X-letter-shaped interface between the right angled prisms bonded to each other.

The image light having exited out of the light combining system 5 is enlarged and projected by the projection optical apparatus 6 to form an image on the screen SCR. That is, the projection optical apparatus 6 projects the light fluxes modulated by the light modulators 4R, 4G, and 4B. The projection optical apparatus 6 is formed of a plurality of lenses.

The configuration of the second illuminator 2B will subsequently be described.

Figure 2:
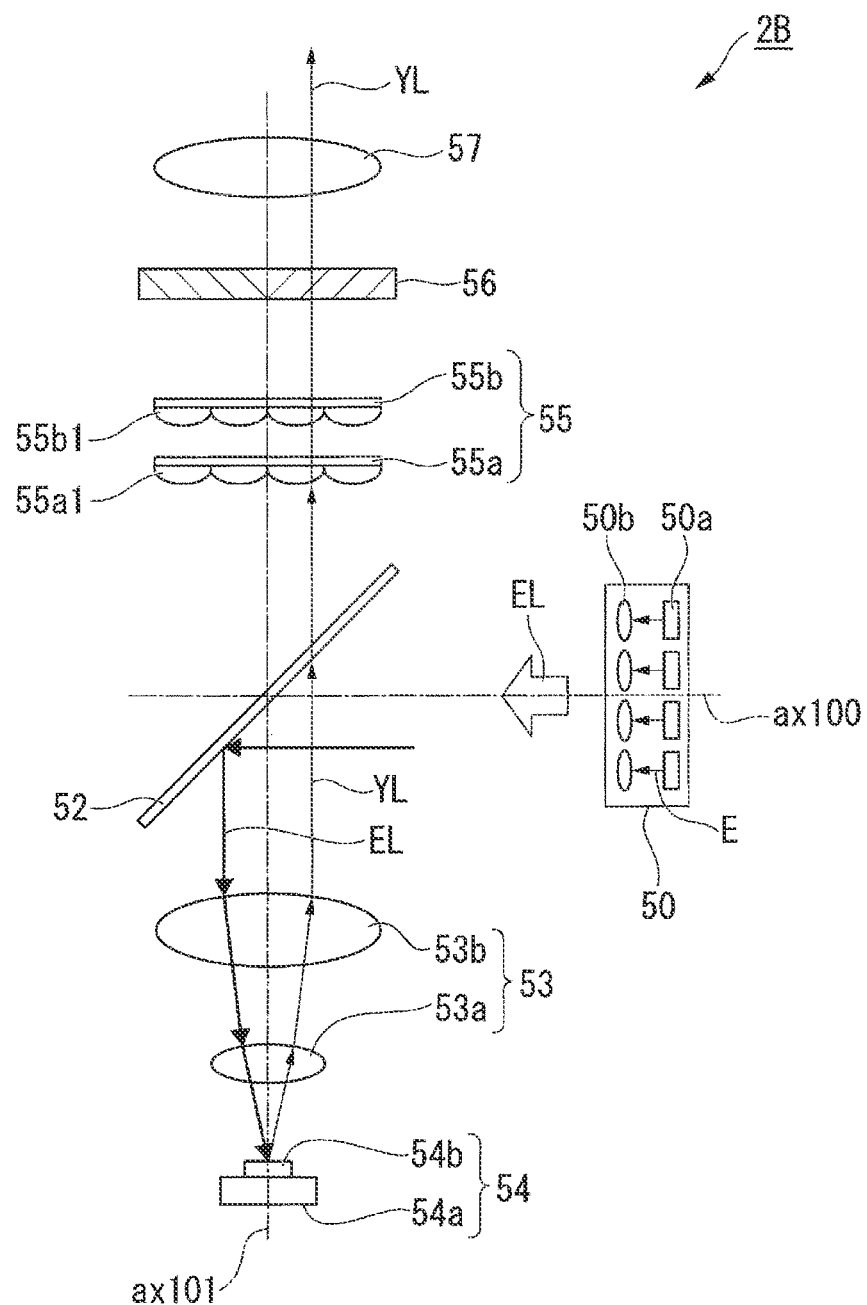
FIG. 2 shows a schematic configuration of a second illuminator according to the first embodiment.

FIG. 2 shows a schematic configuration of the second illuminator 2B.

The second illuminator 2B includes an excitation light source (second light source) 50, a dichroic mirror 52, a pickup system 53, a wavelength converter 54, a lens integrator unit 55, a polarization converter 56, and a superimposing lens 57, as shown in FIG. 2.

The excitation light source 50 is formed of a plurality of semiconductor lasers (solid-state light source) 50a, which each output an excitation light beam E, and a plurality of collimator lenses 50b. The wavelength band of the excitation light beams E ranges, for example, from 440 to 450 nm, and the wavelength at which the intensity of the outputted light peaks, for example, at 445 nm. That is, the excitation light beams E are each blue light. The semiconductor lasers 50a may instead each output an excitation light beam E having a peak wavelength other than 445 nm, for example a peak wavelength of 455 nm or 460 nm.

The collimator lenses 50b are provided in correspondence with the semiconductor lasers 50a. That is, the number of collimator lenses 50b is equal to the number of the semiconductor lasers 50a. The collimator lenses 50b substantially parallelize the excitation light beams E outputted from the corresponding semiconductor lasers 50a.

Based on the configuration described above, the excitation light source 50 can output excitation light EL containing the plurality of excitation light beams E.

In the second illuminator 2B, the excitation light source 50 and the dichroic mirror 52 are disposed along an optical axis ax100 of the excitation light source 50. The wavelength converter 54, the pickup system 53, the dichroic mirror 52, the lens integrator unit 55, the polarization converter 56, and the superimposing lens 57 are arranged along an illumination optical axis ax101 of the second illuminator 2B.

The excitation light EL outputted from the excitation light source 50 is incident on the dichroic mirror 52. The dichroic mirror 52 is so disposed as to incline by an angle of 45° with respect to the optical axis ax100 and the illumination optical axis ax101. The dichroic mirror 52 is so optically characterized as to reflect the excitation light EL and transmit the fluorescence YL, which will be described later. The dichroic mirror 52 is formed, for example, of a dielectric multilayer film in which a plurality of $SiO_2$ films and $TiO_2$ films are alternately layered on each other.

The pickup system 53 has the function of causing the excitation light EL reflected off the dichroic mirror 52 to converge and enter the wavelength converter 54 and the function of picking up and parallelizing the fluorescence YL emitted from the wavelength converter 54, as will be described later. The pickup system 53 is formed, for example, of two convex lenses 53a and 53b.

The wavelength converter 54 includes a base 54a and a wavelength conversion layer 54b. The base 54a is a support substrate that supports the wavelength conversion layer 54b and desirably has high thermal conductivity. The wavelength conversion layer 54b converts the excitation light beams E to produce the fluorescence (wavelength-converted light) YL. A reflection film may be provided between the base 54a and the wavelength conversion layer 54b.

The wavelength conversion layer 54b may contain a ceramic phosphor or a single crystal phosphor. The wavelength band of the fluorescence YL ranges, for example, from 490 nm to 750 nm. That is, the fluorescence YL is yellow light containing the green light component and the red light component.

The wavelength conversion layer 54b contains, for example, an yttrium-aluminum-garnet-based (YAG-based) phosphor. Consider YAG:Ce, which contains cerium (Ce) as an activator, by way of example, and the wavelength conversion layer 54b can be made, for example, of a material produced by mixing raw powder materials containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The pickup system 53 substantially parallelizes the fluorescence YL emitted from the wavelength converter 54. The fluorescence YL substantially parallelized by the pickup system 53 passes through the dichroic mirror 52 and enters the lens integrator unit 55.

The lens integrator unit 55 includes a first lens array 55a and a second lens array 55b. The first lens array 55a includes a plurality of first lenses 55a1 for dividing the fluorescence YL having exited out of the dichroic mirror 52 into a plurality of sub-light fluxes. The plurality of first lenses 55a1 are arranged in a matrix in a plane perpendicular to the illumination optical axis ax101 of the second illuminator 2B.

The second lens array 55b includes a plurality of second lenses 55b1 corresponding to the plurality of first lenses 55a1 of the first lens array 55a. The second lens array 55b along with the superimposing lens 57 forms images of the first lenses 55a1 of the first lens array 55a in the vicinity of the image formation area of each of the light modulators 4G and 4R. The plurality of second lenses 55b1 are arranged in a matrix in a plane perpendicular to the illumination optical axis ax101.

The fluorescence YL having passed through the lens integrator unit 55 enters the polarization converter 56. The polarization converter 56 includes polarization separation films and retardation films arranged in an array. The polarization converter 56 aligns the polarization directions of the fluorescence YL with one another into a predetermined direction. Specifically, the polarization converter 56 aligns the polarization directions of the fluorescence YL with the direction of the transmission axis of the light-incident-side polarizers disposed on the light modulators 4G and 4R.

The polarization directions of the green light LG and the red light LR provided by separation of the fluorescence YL having passed through the polarization converter 56 thus coincide with the transmission axis of the light-incident-side polarizers associated with the light modulators 4G and 4R. The green light LG and the red light LR are incident on the image formation areas of the light modulators 4G and 4R without being blocked by the light-incident-side polarizers.

The fluorescence YL having passed through the polarization converter 56 enters the superimposing lens 57. The superimposing lens 57 cooperates with the lens integrator unit 55 to homogenize the illuminance distribution of the fluorescence YL in the image formation areas of the light modulators 4G and 4R, which are illumination receiving areas.

As described above, the fluorescence YL outputted from the second illuminator 2B is separated by the dichroic mirror 3a of the color separation system 3 into the green light LG and the red light LR. In the present embodiment, the green light (second light) LG separated from the fluorescence YL is incident on the light modulator (second light modulator) 4G. The red light (third light) LR separated from the fluorescence YL is incident on the light modulator (third light modulator) 4R.

In the following description, the optical path along which the green light LG having exited out of the dichroic mirror 3a and incident on the light modulator 4G travels is referred to as a second optical path LA2, and the optical path along which the red light LR having exited out of the dichroic mirror 3a and incident on the light modulator 4R travels is referred to as a third optical path LA3. In FIG. 1, for example, the optical path of the chief ray of the green light LG is drawn as the second optical path LA2, and the optical path of the chief ray of the red light LR is drawn as the third optical path LA3.

The configuration of the first illuminator 2A will subsequently be described.

Figure 3:
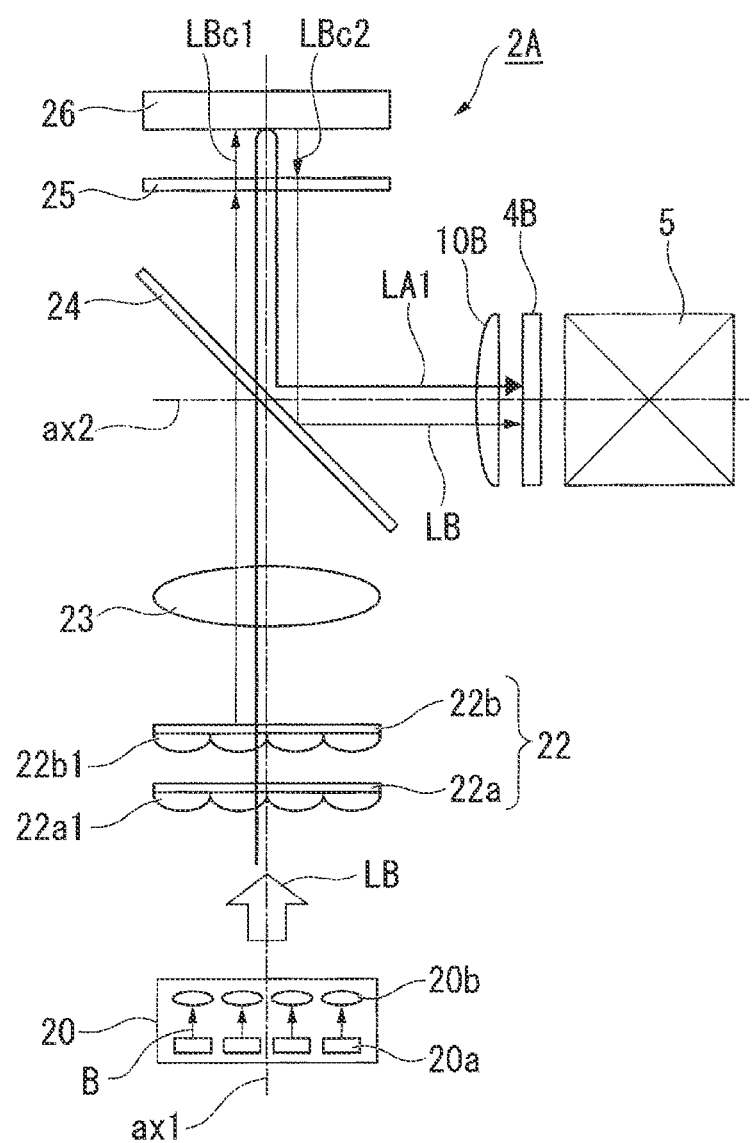
FIG. 3 shows a schematic configuration of a first illuminator according to the first embodiment.

FIG. 3 shows a schematic configuration of the first illuminator 2A.

The first illuminator 2A includes a first light source 20, a lens integrator unit 22, a superimposing lens 23, a polarization separation mirror (first polarization separator) 24, a retardation film (first retardation film) 25, and a mirror (first reflector) 26, as shown in FIG. 3.

The first light source 20, the lens integrator unit 22, the superimposing lens 23, the polarization separation mirror 24, the retardation film 25, and the mirror 26 are arranged along an optical axis ax1 of the first light source 20.

In the projector 1 according to the present embodiment, the optical path of the light outputted from the first light source 20 of the first illuminator 2A and incident on the light modulator 4B is independent of the optical paths of the green light LG and the red light LR incident on the light modulators 4G and 4R. That is, in the projector 1 according to the present embodiment, a first optical path LA1, along which the blue light LB outputted from the first illuminator 2A travels, does not intersect the second optical path LA2 of the green light LG or the third optical path LA3 of the red light LR, as shown in FIG. 1.

The first light source 20 includes a plurality of semiconductor lasers (solid-state light source) 20a, which each output a blue light beam B formed of laser light, and a plurality of collimator lenses 20b. The intensity of the outputted blue light beams B peaks, for example, at 445 nm. The semiconductor lasers 20a may instead each output blue light having a peak wavelength other than 445 nm, for example a peak wavelength of 455 nm or 460 nm.

The collimator lenses 20b are provided in correspondence with the semiconductor lasers 20a. That is, the number of collimator lenses 20b is equal to the number of the semiconductor lasers 20a. The collimator lenses 20b substantially parallelize the blue light beams B outputted from the corresponding semiconductor lasers 20a.

Based on the configuration described above, the first light source 20 can output the blue light LB containing the plurality of blue light beams B.

In the first illuminator 2A in the present embodiment, the blue light (first light) LB outputted from the first light source 20 and incident on the light modulator 4B is referred to as the first optical path LA1. In FIG. 3, the optical path along which the chief ray of the blue light LB travels is shown as the first optical path LA1.

In the first illuminator 2A in the present embodiment, the first light source 20, the lens integrator unit 22, the superimposing lens 23, the polarization separation mirror 24, the retardation film 25, and the mirror 26 are arranged along the first optical path LA1.

The lens integrator unit 22 includes a first lens array 22a and a second lens array 22b. The first lens array 22a includes a plurality of first lenses 22a1 for dividing the blue light LB outputted from the first light source 20 into a plurality of sub-light fluxes.

The second lens array 22b includes a plurality of second lenses 22b1 corresponding to the plurality of first lenses 22a1 of the first lens array 22a. The second lens array 22b along with the superimposing lens 23 forms images of the first lenses 22a1 of the first lens array 22a in the vicinity of the image formation area of the light modulator 4B.

The superimposing lens 23 causes the sub-light fluxes having exited out of the second lens array 22b to converge and superimposes the sub-light fluxes to be superimposed on one another in the vicinity of the image formation area of the light modulator 4B. The lens integrator unit 22 and the superimposing lens 23 thus homogenize the in-plane optical intensity distribution of the blue light LB.

In the present embodiment, the blue light LB outputted from the first light source 20 is linearly polarized light. Specifically, the blue light LB is linearly polarized light to be incident as P-polarized light on the polarization separation mirror 24.

The polarization separation mirror 24 is so disposed in the first optical path LA1 of the blue light LB traveling from the superimposing lens 23 toward the mirror 26 as to intersect by an angle of 45° the optical axis ax1 of the first light source 20 and an illumination optical axis ax2 of the first illuminator 2A. The optical axis ax1 and the illumination optical axis ax2 are axes perpendicular to each other and disposed in the same plane.

The polarization separation mirror 24 has a polarization separation function of separating the light incident thereon into light formed of an S-polarized component and light formed of a P-polarized component. Specifically, the polarization separation mirror 24 is so characterized as to transmit the light formed of the P-polarized component and reflect the light formed of the S-polarized component.

Since the blue light LB outputted from the first light source 20 is incident as P-polarized light on the polarization separation mirror 24, the blue light LB passes through the polarization separation mirror 24 and enters the retardation film 25. The retardation film 25 is formed of a quarter wave plate. The P-polarized blue light LB having passed through the polarization separation mirror 24 is converted by the retardation film 25 into, for example, right-handed circularly polarized blue light LBc1 and then incident on the mirror 26.

The mirror 26 is formed, for example, of a flat mirror. That is, the mirror 26 reflects the blue light LBc1 in such a way that the optical path thereof is deflected back in the opposite direction.

The blue light beams B reflected off the mirror 26 are hereinafter referred to as blue light LBc2. For example, the right-handed circularly polarized blue light LBc1 is reflected as left-handed circularly polarized blue light LBc2 off the mirror 26. The blue light LBc2 enters the retardation film 25 again.

The left-handed circularly polarized blue light LBc2 is converted by the retardation film 25 into S-polarized blue light LB. The S-polarized blue light LB is reflected off the polarization separation mirror 24 toward the field lens 10B and incident as the blue light LB on the light modulator 4B via the field lens 10B. As described above, in the present embodiment, the blue light LB outputted from the first light source 20 is variously converted in terms of polarization state from linearly polarized light into circularly polarized light and further into linearly polarized light and incident on the light modulator 4B.

The projector 1 according to the present embodiment, in which the blue light LB outputted from the first illuminator 2A is separately incident on the light modulator 4B and the green light LG and the red light LR separated from the fluorescence YL produced in the second illuminator 2B are incident on the light modulators 4G and 4R, respectively, can display high-quality color video images.

In the projector 1 according to the present embodiment, the first optical path LA1 of the blue light beams B outputted from the first illuminator 2A is deflected back by the mirror 26 after passing through the polarization separation mirror 24 and the retardation film 25 and reaches the light modulator 4B via the retardation film 25 and the polarization separation mirror 24.

As described above, a desired optical path length of the first optical path LA1 of the blue light beams B, which is deflected back in a halfway position in the first optical path LA1, can be ensured with the apparent optical path length of the blue light beams B maintained short. The parts of the first illuminator 2A that are arranged along the first optical path LA1, which has an apparent short optical path length, can therefore be arranged at reduced intervals. That is, the first illuminator 2A has a compact apparatus configuration.

As described above, according to the projector 1 according to the present embodiment, the apparent optical path length in the first illuminator 2A can be suppressed and the projector 1 can have a compact apparatus configuration even when the configuration in which the blue light LB is separately incident on the light modulator 4B is employed.

Second Embodiment

An example of a projector according to a second embodiment will be subsequently described.

The present embodiment differs from the first embodiment in terms of the configuration of the first illuminator, and the difference in the configuration of the first illuminator will therefore be primarily described below.

Figure 4:
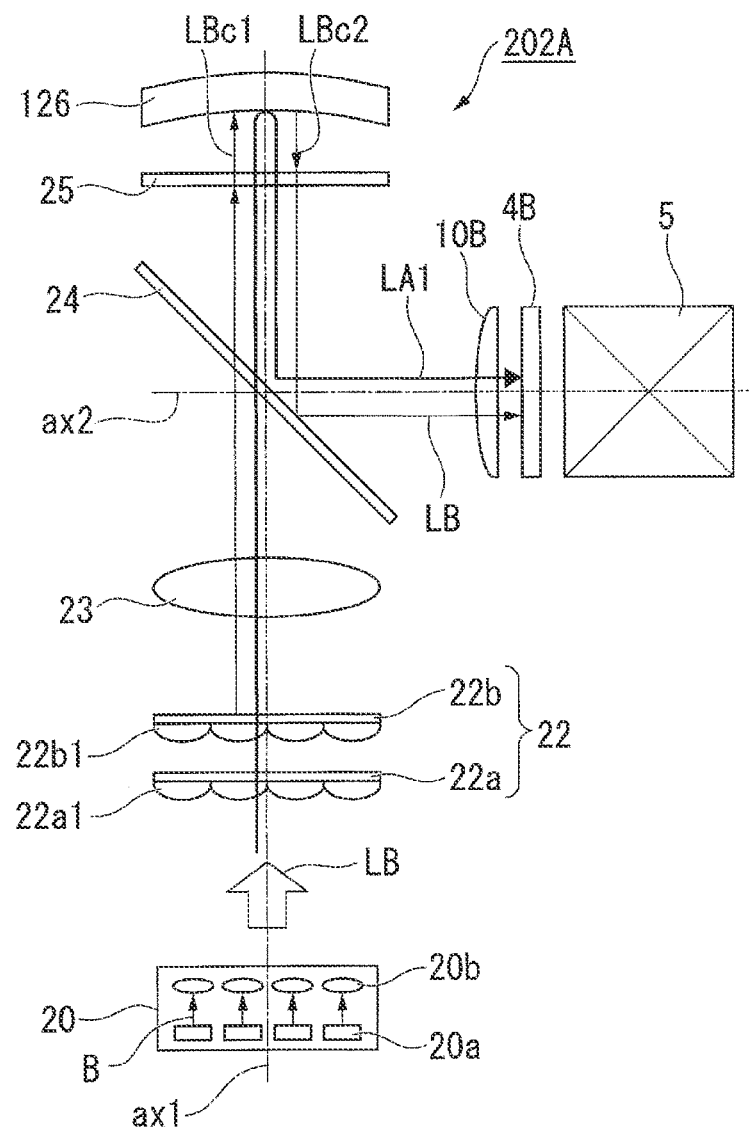
FIG. 4 shows a schematic configuration of a first illuminator in a second embodiment.

FIG. 4 shows a schematic configuration of the first illuminator of the projector according to the present embodiment. In the present embodiment, configurations common to those in the first embodiment have the same reference characters and will not be described in detail.

A first illuminator 202A in the present embodiment includes the first light source 20, the lens integrator unit 22, the superimposing lens 23, the polarization separation mirror 24, the retardation film 25, and a mirror (first reflector) 126, as shown in FIG. 4.

The mirror 126 in the present embodiment is formed, for example, of a concave mirror. That is, the mirror 126 can reflect the blue light LBc1 with the blue light LBc1 being convergent when deflecting back the optical path of the blue light LBc1 in the opposite direction. In the present embodiment, the mirror 126 has the function of a convex lens, which causes light to converge.

The first illuminator 202A in the present embodiment, in which the light convergent capability of the mirror 126, which is formed of a concave mirror, is combined with the capability of the first illuminator 202A in the first embodiment, allows the lens power of the superimposing lens 23 to be reduced. That is, suppressing the lens power of the superimposing lens 23 can suppress the cost of the superimposing lens 23. Further, aberrations produced by the superimposing lens 23 can be reduced.

As described above, the first illuminator 202A in the present embodiment, in which the lens power of the superimposing lens 23 is suppressed, allows cost reduction. The projector including the first illuminator 202A in the present embodiment therefore also allows cost reduction.

Third Embodiment

An example of a projector according to a third embodiment will be subsequently described.

The present embodiment differs from the first embodiment in terms of the configurations of the first and second illuminators. The configurations of the first and second illuminators will therefore be primarily described below.

Figure 5:
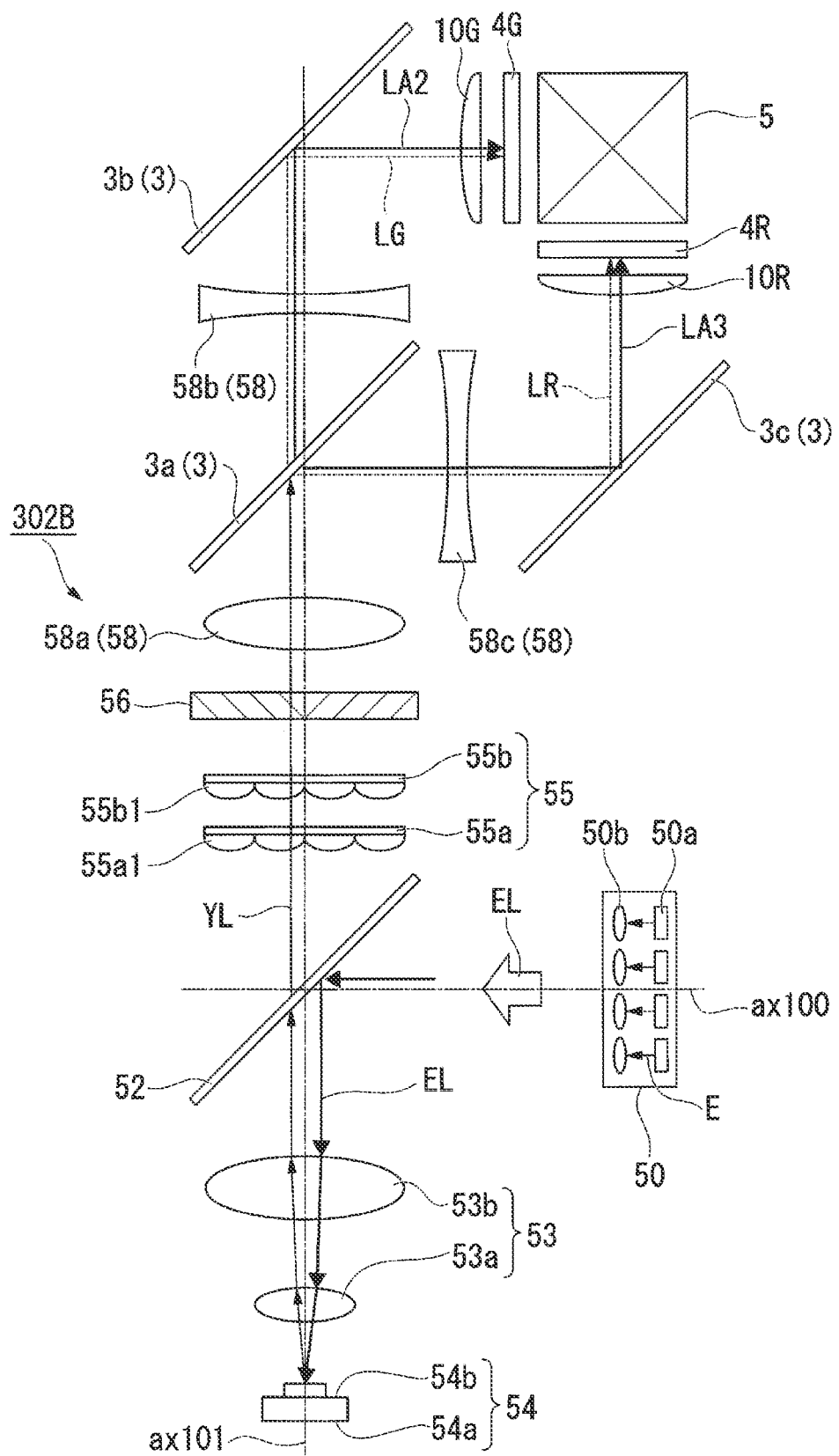
FIG. 5 shows a schematic configuration of a second illuminator in a third embodiment.

FIG. 5 shows a schematic configuration of the second illuminator. FIG. 5 further shows the configuration around the light modulators 4G and 4R, on which the light from the second illuminator is incident.

A second illuminator 302B in the present embodiment includes the excitation light source section (second light source) 50, the dichroic mirror 52, the pickup system 53, the wavelength converter 54, the lens integrator unit 55, the polarization converter 56, and a superimposing system 58, as shown in FIG. 5.

The superimposing system 58 cooperates with the lens integrator unit 55 to homogenize the illuminance distribution of the fluorescence YL in the illumination receiving areas. The superimposing system 58 includes a first lens 58a, a second lens 58b, and a third lens 58c. The first lens 58a is formed of a convex lens, and the second lens 58b and the third lens 58c are each formed of a concave lens.

In the second illuminator 302B in the present embodiment, the dichroic mirror 3a, which forms the color separation system 3, is provided between the first lens 58a and the second lens 58b. That is, the fluorescence YL passes through the first lens 58a and is then separated by the dichroic mirror 3a into the green light LG and the red light LR. Only the green light LG contained in the fluorescence YL therefore enters the second lens 58b. That is, the first lens 58a and the second lens 58b function as a superimposing system that causes the green light fluxes LG to be superimposed on one another and incident on the image formation area of the light modulator 4G.

The superimposing system 58, which is formed of the first lens 58a and the second lens 58b, forms a telescopic optical system that is the combination of the convex lens and the concave lens and therefore increases the focal length of the telescopic optical system with the overall length thereof suppressed. The superimposing system 58, which is formed of the first lens 58a and the second lens 58b and increases the distance at which the green light LG is focused with the apparent length of the second optical path LA2, along which the green light LG travels, suppressed, can increase the F number of the illumination system, whereby the contrast of an image produced in the image formation area of the light modulator 4G can be improved.

Further, only the red light LR contained in the fluorescence YL enters the third lens 58c. That is, the first lens 58a and the third lens 58c function as a superimposing system that causes the red light fluxes LR to be superimposed on one another and incident on the image formation area of the light modulator 4R. The superimposing system that is formed of the first lens 58a and the third lens 58c and increases the distance at which the red light LR is focused with the apparent length of the third optical path LA3, along which the red light LR travels, suppressed, can increase the F number of the illumination system, whereby the contrast of an image produced in the image formation area of the light modulator 4R can be improved.

Figure 6:
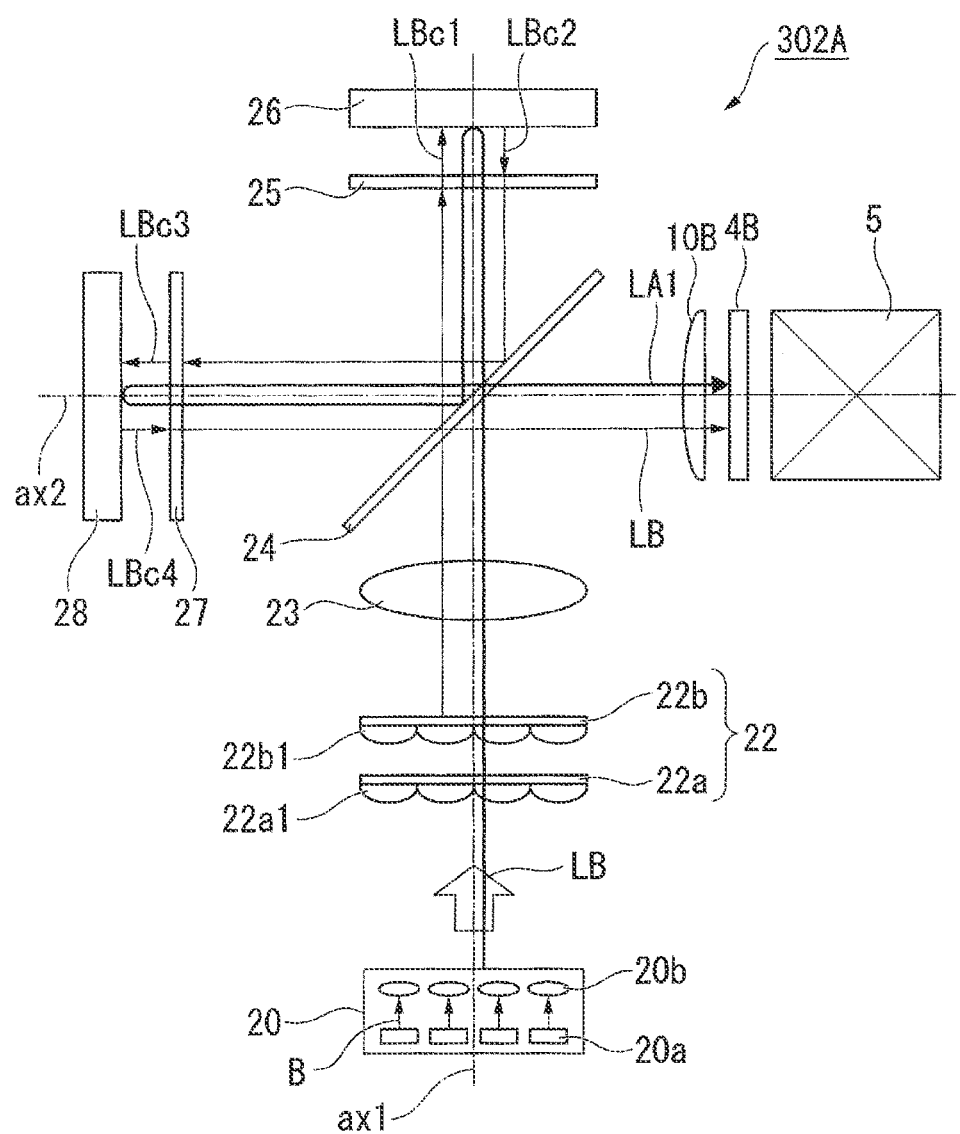
FIG. 6 shows a schematic configuration of a first illuminator in the third embodiment.

FIG. 6 shows a schematic configuration of the first illuminator 302A. FIG. 6 further shows the configuration around the light modulator 4B, on which the light from the first illuminator is incident.

The first illuminator 302A includes the first light source 20, the lens integrator unit 22, the superimposing lens 23, the polarization separation mirror 24, the retardation film 25, the mirror 26, a retardation film (second retardation film) 27, and a mirror (second reflector) 28, as shown in FIG. 6.

The first light source 20, the lens integrator unit 22, the superimposing lens 23, the polarization separation mirror 24, the retardation film 25, and the mirror 26 are arranged along the optical axis ax1 of the first light source 20.

The mirror 28, the retardation film 27, and the polarization separation mirror 24 are arranged along the illumination optical axis ax2 of the first illuminator 302A. The polarization separation mirror 24 is so disposed as to intersect the optical axis ax1 and the illumination optical axis ax2 at an angle of 45°.

In the first illuminator 302A in the present embodiment, the first light source 20, the lens integrator unit 22, the superimposing lens 23, the polarization separation mirror 24, the retardation film 25, the mirror 26, the retardation film 27, and the mirror 28 are provided along the first optical path LA1.

Specifically, in the first illuminator 302A in the present embodiment, the blue light LB converted into S-polarized light when reflected off the mirror 26 and passing through the retardation film 25 is reflected off the polarization separation mirror 24 and enters the retardation film 27. The retardation film 27 is formed of a quarter wave plate. The S-polarized blue light LB is converted by the retardation film 27 into, for example, left-handed circularly polarized blue light LBc3 and then incident on the mirror 28.

The mirror 28 is formed, for example, of a flat mirror. That is, the mirror 28 reflects the left-handed circularly polarized blue light LBc3 in such a way that the optical path thereof is deflected back in the opposite direction. In this process, the left-handed circularly polarized blue light LBc3 is reflected as right-handed circularly polarized blue light LBc4 off the mirror 28 and enters the retardation film 27 again.

The right-handed circularly polarized blue light LBc4 is converted by the retardation film 27 into P-polarized blue light LB. The P-polarized blue light LB passes through the polarization separation mirror 24 and is incident on the light modulator 4B via the field lens 10B. As described above, in the present embodiment, the blue light LB outputted from the first light source 20 is variously converted in terms of polarization state from linearly polarized light into circularly polarized light and further into linearly polarized light and incident on the light modulator 4B.

In the first illuminator 302A in the present embodiment, the first optical path LA1, along which the blue light LB travels, is deflected back by the mirror 26 after passing through the polarization separation mirror 24 and the retardation film 25, is deflected back again by the mirror 28 after passing through the retardation film 25 and the polarization separation mirror 24 and further the retardation film 27, and reaches the light modulator 4B via the retardation film 27 and the polarization separation mirror 24.

In the first illuminator 302A, the first optical path LA1, the second optical path LA2, and the third optical path LA3 are so designed as to have the same optical path length.

According to the first illuminator 302A in the present embodiment, the optical path length of the first optical path LA1, which is deflected back twice in halfway positions in the first optical path LA1, can be as long as those of the second optical path LA2 and the third optical path LA3 with the apparent optical path length of the blue light LB maintained short. Therefore, the first illuminator 302A in the present embodiment can ensure further longer optical path length to increase the F number of the illumination system with no enlargement of the apparatus configuration of the projector, whereby the contrast of an image produced in the image formation area of the light modulator 4R can be improved.

Fourth Embodiment

An example of a projector according to a fourth embodiment will be subsequently described.

The present embodiment differs from the first embodiment in terms of the configuration of the first illuminator, and the difference in the configuration of the first illuminator will therefore be primarily described below.

Figure 7:
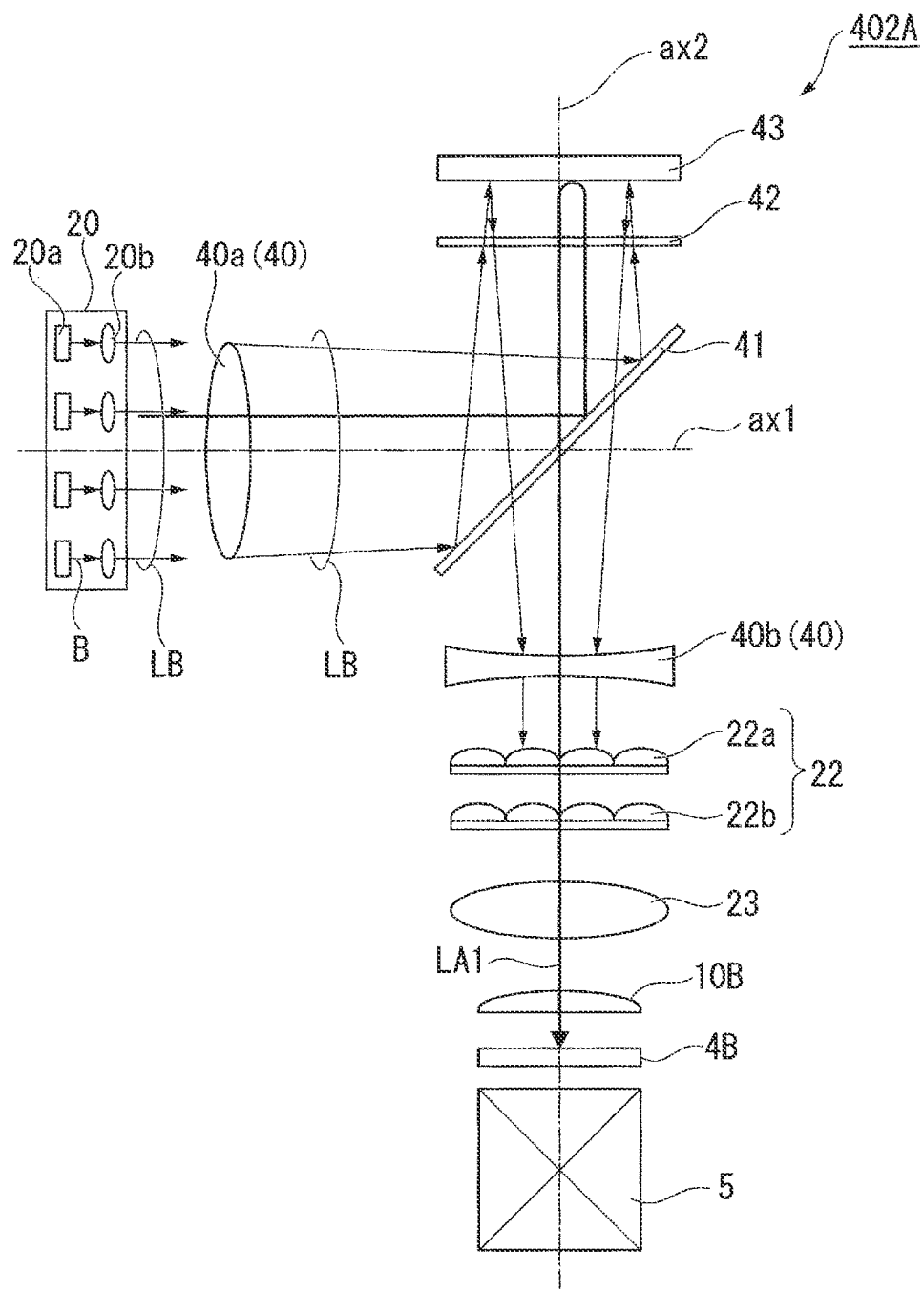
FIG. 7 shows a schematic configuration of a first illuminator in a fourth embodiment.

FIG. 7 shows a schematic configuration of the first illuminator of the projector according to the present embodiment. FIG. 7 further shows the configuration around the light modulator 4B, on which the light from the first illuminator is incident.

A first illuminator 402A in the present embodiment includes the first light source 20, an afocal system 40, a polarization separation mirror (first polarization separator) 41, a retardation film (first retardation film) 42, a mirror (first reflector) 43, the lens integrator unit 22, and the superimposing lens 23, as shown in FIG. 7.

The afocal system 40 reduces the light flux diameter of the blue light LB outputted from the first light source 20. The afocal system 40 includes a first lens 40a and a second lens 40b arranged along the first optical path LA1, along which the blue light LB travels. The first lens 40a is formed, for example, of a convex lens, and the second lens 40b is formed, for example, of a concave lens.

In the first illuminator 402A in the present embodiment, the first light source 20, the first lens 40a, and the polarization separation mirror 41 are arranged along the optical axis ax1 of the first light source 20. The mirror 43, the retardation film 42, the polarization separation mirror 41, the second lens 40b, and the lens integrator unit 22, and the superimposing lens 23 are arranged along the illumination optical axis ax2 of the first illuminator 302A.

In the first illuminator 402A in the present embodiment, the polarization separation mirror 41, the retardation film 42, and the mirror 43 are disposed in the first optical path LA1 between the first lens 40a and the second lens 40b.

The blue light LB having passed through the first lens 40a, which causes the blue light LB to converge, is incident on the polarization separation mirror 41. In the present embodiment, the blue light LB is incident as S-polarized light on the polarization separation mirror 41. The blue light LB is therefore reflected off the polarization separation mirror 41 and enters the retardation film 42. The retardation film 42 is formed of a quarter wave plate. The S-polarized blue light LB reflected off the polarization separation mirror 41 is converted by the retardation film 42 into, for example, left-handed circularly polarized blue light and then incident on the mirror 43, which is formed of a flat mirror. The mirror 43 reflects the left-handed circularly polarized blue light LB in such a way that the optical path thereof is deflected back in the opposite direction.

The blue light LB is reflected off the mirror 43, which converts the blue light LB into right-handed circularly polarized light, which passes through the retardation film 42 again, which converts the right-handed circularly polarized light into P-polarized light. The P-polarized blue light LB passes through the polarization separation mirror 41 and is substantially parallelized by the second lens 40b into blue light LB having a predetermined reduced light flux diameter. The blue light LB having the light flux diameter reduced by the afocal system 40 enters the field lens 10B via the lens integrator unit 22 and the superimposing lens 23 and is incident on the light modulator 4B via the field lens 10B. In the thus configured present embodiment, the blue light LB outputted from the first light source 20 is variously converted in terms of polarization state from linearly polarized light into circularly polarized light and further into linearly polarized light and incident on the light modulator 4B.

As described above, according to the first illuminator 402A in the present embodiment, the first optical path LA1 of the blue light LB between the first lens 40a and the second lens 40b, which form the afocal system 40, is deflected back between the polarization separation mirror 41 and the mirror 43.

The first illuminator 402A in the present embodiment, in which the first optical path LA1 of the blue light LB is deflected back, allows a decrease in the apparent optical path length between the first lens 40a and the second lens 40b, which form the afocal system 40. That is, the first illuminator 402A in the present embodiment, in which the apparent optical path length between the first lens 40a and the second lens 40b, which form the afocal system 40, is shortened, can suppress enlargement of the apparatus configuration of the projector using the afocal system 40.

The present embodiment has been described with reference to the case where a Galileo-type optical system that is the combination of a convex lens and a concave lens is used as the afocal system 40, and a Kepler-type optical system that is the combination of two convex lenses may be used as the afocal system 40.

Fifth Embodiment

An example of a projector according to a fifth embodiment will be subsequently described.

The present embodiment differs from the fourth embodiment in terms of the configuration of the first illuminator, and the difference in the configuration of the first illuminator will therefore be primarily described below.

Figure 8:
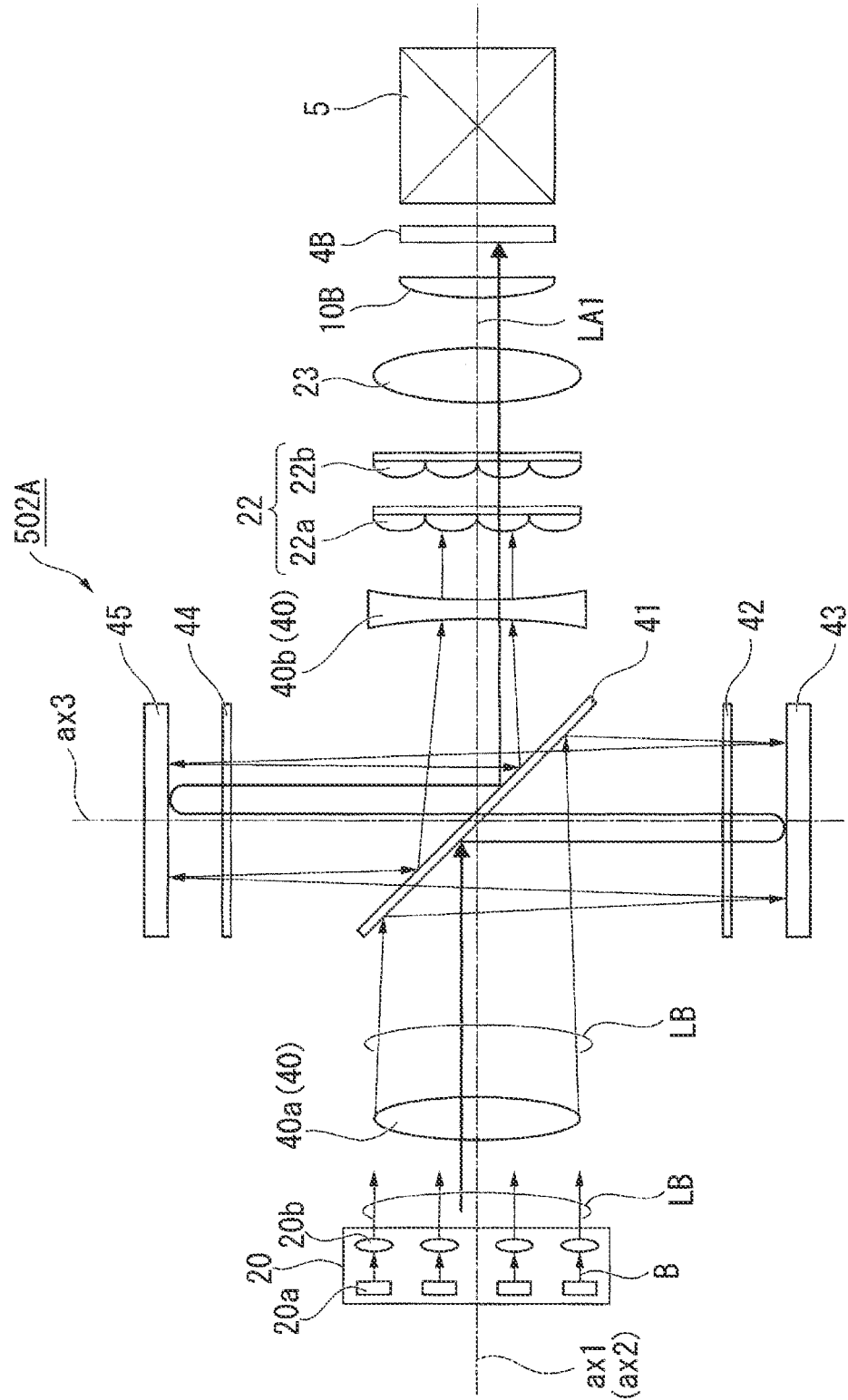
FIG. 8 shows a schematic configuration of a first illuminator in a fifth embodiment.

FIG. 8 shows a schematic configuration of the first illuminator of the projector according to the present embodiment. FIG. 8 further shows the configuration around the light modulator 4B, on which the light from the first illuminator is incident.

A first illuminator 502A in the present embodiment includes the first light source 20, the afocal system 40, the polarization separation mirror 41, the retardation film 42, the mirror 43, a retardation film (second retardation film) 44, a mirror (second reflector) 45, the lens integrator unit 22, and the superimposing lens 23, as shown in FIG. 8.

In the first illuminator 502A in the present embodiment, the first light source 20, the first lens 40a, the polarization separation mirror 41, the second lens 40b, the lens integrator unit 22, and the superimposing lens 23 are arranged along the optical axis ax1 of the first light source 20. In the present embodiment, the optical axis ax1 of the first light source 20 coincides with the illumination optical axis ax2 of the first illuminator 502A.

The mirror 43, the retardation film 42, the polarization separation mirror 41, the retardation film 44, and the mirror 45 are arranged along an optical axis ax3 perpendicular to the optical axis ax1. The polarization separation mirror 41 is so disposed as to incline by an angle of 45° with respect to the optical axis ax1 and the optical axis ax3.

In the first illuminator 502A in the present embodiment, the polarization separation mirror 41, the retardation film 42, the mirror 43, the retardation film 44, and the mirror 45 are disposed along the first optical path LA1 between the first lens 40a and the second lens 40b.

In the present embodiment, the blue light LB is deflected back by the mirror 43 and passes through the retardation film 42, which converts the blue light LB into P-polarized blue light LB, which passes through the polarization separation mirror 41. The P-polarized blue light LB having passed through the polarization separation mirror 41 enters the retardation film 44. The retardation film 44 is formed of a quarter wave plate. The P-polarized blue light LB is converted by the retardation film 44 into, for example, right-handed circularly polarized blue light and then incident on the mirror 45, which is formed of a flat mirror. The mirror 45 reflects the right-handed circularly polarized blue light LB in such a way that the optical path thereof is deflected back in the opposite direction.

The blue light LB is reflected off the mirror 45, which converts the blue light LB into left-handed circularly polarized light, which passes through the retardation film 44 again, which converts the left-handed circularly polarized light into S-polarized light. The S-polarized blue light LB is reflected off the polarization separation mirror 41 and is substantially parallelized by the second lens 40b into blue light LB having a predetermined reduced light flux diameter. The blue light LB having the light flux diameter reduced by the afocal system 40 enters the field lens 10B via the lens integrator unit 22 and the superimposing lens 23 and is incident as the blue light LB on the light modulator 4B via the field lens 10B. As described above, in the present embodiment, the blue light LB outputted from the first light source 20 is variously converted in terms of polarization state from linearly polarized light into circularly polarized light, into linearly polarized light, into circularly polarized light, and further into linearly polarized light and incident on the light modulator 4B.

As described above, according to the first illuminator 502A in the present embodiment, the first optical path LA1 of the blue light LB between the first lens 40a and the second lens 40b, which form the afocal system 40, is deflected back twice between the mirrors 43 and 45. The first illuminator 502A in the present embodiment allows a further decrease in the apparent optical path length of the first optical path LA1 between the first lens 40a and the second lens 40b, which form the afocal system 40. The first illuminator 502A in the present embodiment can therefore suppress enlargement of the apparatus configuration of the projector using the afocal system 40 capable of further reducing the light flux diameter of the blue light LB.

The present embodiment has been described with reference to the case where a Galileo-type optical system that is the combination of a convex lens and a concave lens is used as the afocal system 40, and a Kepler-type optical system that is the combination of two convex lenses may be used as the afocal system 40.

Sixth Embodiment

An example of a projector according to a sixth embodiment will be subsequently described.

Figure 9:
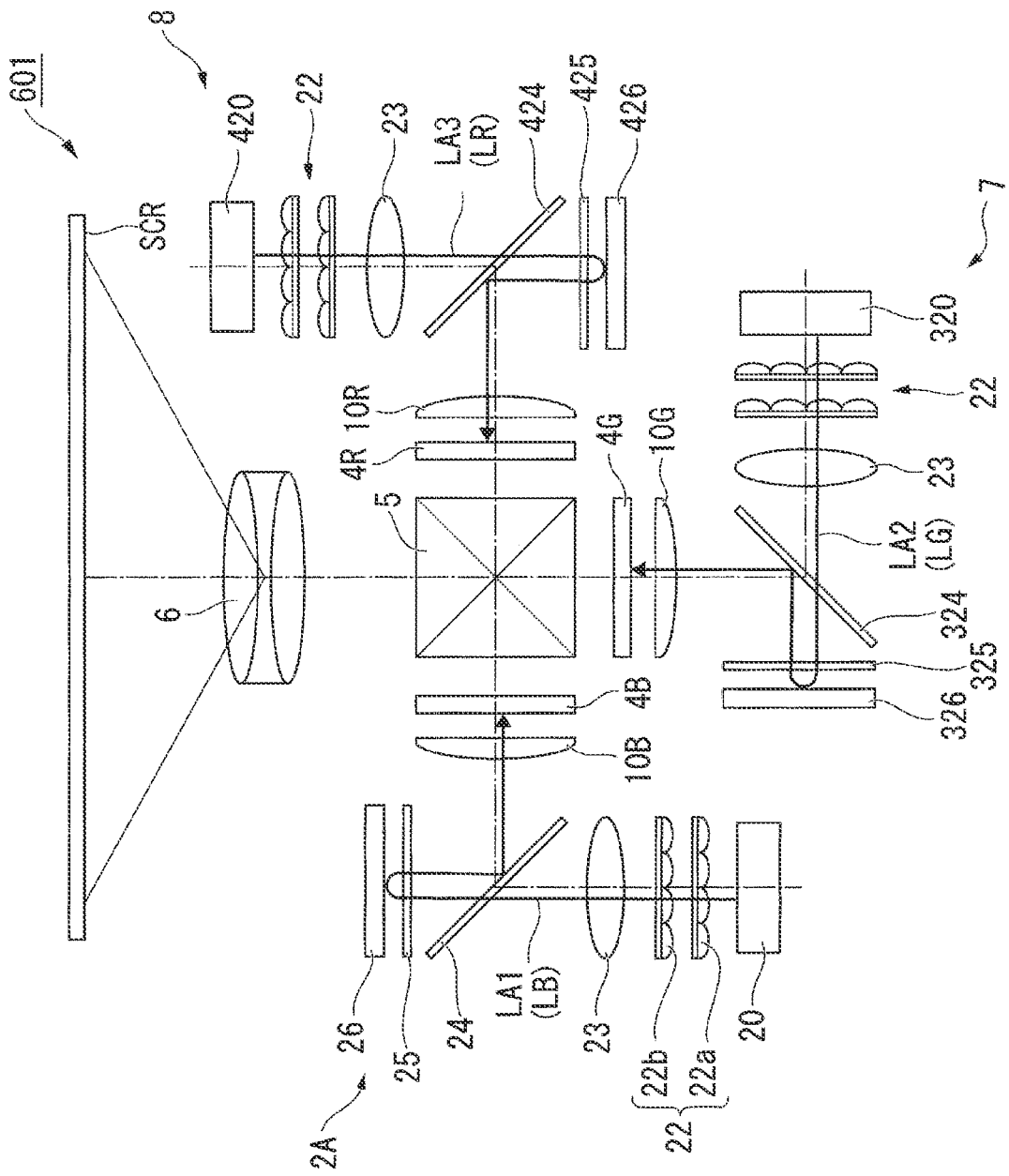
FIG. 9 shows a schematic configuration of a projector according to a sixth embodiment.

FIG. 9 shows a schematic configuration of the projector according to the present embodiment.

A projector 601 according to the present embodiment includes the first illuminator 2A, a second illuminator 7, a third illuminator 8, the light modulator 4R, the light modulator 4G, the light modulator 4B, the light combining system 5, and the projection optical apparatus 6, as shown in FIG. 9.

In the present embodiment, the second illuminator 7 outputs the green light LG. The green light LG outputted from the second illuminator 7 is incident as the green light LG on the light modulator 4G via the field lens 10G.

In the present embodiment, the third illuminator 8 outputs the red light LR. The red light LR outputted from the third illuminator 8 is incident as the red light LR on the light modulator 4R via the field lens 10R.

In the projector 601 according to the present embodiment, the first optical path LA1, along which the blue light LB outputted from the first illuminator 2A travels, the second optical path LA2, along which the green light LG outputted from the second illuminator 7 travels, and the third optical path LA3, along which the red light LR outputted from the third illuminator 8 travels do not intersect each other.

The second illuminator 7 has the same basic configuration as that of the first illuminator 2A although the outputting light has a color different from the color of the light outputted from the first illuminator 2A. That is, the second illuminator 7 includes a second light source 320, the lens integrator unit 22, the superimposing lens 23, a polarization separation mirror (second polarization separator) 324, a retardation film (third retardation film) 325, and a mirror (third reflector) 326.

The second optical path LA2, along which the green light LG outputted from the second illuminator 7 travels, is deflected back by the mirror 326 after passing through the polarization separation mirror 324 and the retardation film 325 and reaches the light modulator 4G via the retardation film 325 and the polarization separation mirror 324.

As described above, a desired optical path length of the second optical path LA2 of the green light LG, which is deflected back in a halfway position in the second optical path LA2, can be provided with the apparent optical path length of the green light LG maintained short. The second illuminator 7 therefore has a compact apparatus configuration.

The third illuminator 8 has the same configuration as that of the first illuminator 2A although the outputting light has a color different from the color of the light outputted from the first illuminator 2A. That is, the third illuminator 8 includes a third light source 420, the lens integrator unit 22, the superimposing lens 23, a polarization separation mirror (third polarization separator) 424, a retardation film (fourth retardation film) 425, and a mirror (fourth reflector) 426.

The third optical path LA3, along which the red light LR outputted from the third illuminator 8 travels, is deflected back by the mirror 426 after passing through the polarization separation mirror 424 and the retardation film 425 and reaches the light modulator 4R via the retardation film 425 and the polarization separation mirror 424.

As described above, a desired optical path length of the third optical path LA3 of the red light LR, which is deflected back in a halfway position in the third optical path LA3, can be provided with the apparent optical path length of the red light LR maintained short. The third illuminator 8 therefore has a compact apparatus configuration.

As described above, the projector 601 according to the present embodiment, which includes the first illuminator 2A, the second illuminator 7, and the third illuminator 8, which each have a suppressed apparent optical path length, has a compact apparatus configuration even when the red light LR, the green light LG, and the blue light LB are incident on the light modulators 4R, 4G, and 4B, respectively, via optical paths independent of one another.

Seventh Embodiment

An example of a projector according to a seventh embodiment will be subsequently described.

The present embodiment differs from the first embodiment in terms of the configuration of the first illuminator, and the difference in the configuration of the first illuminator will therefore be primarily described below.

Figure 10:
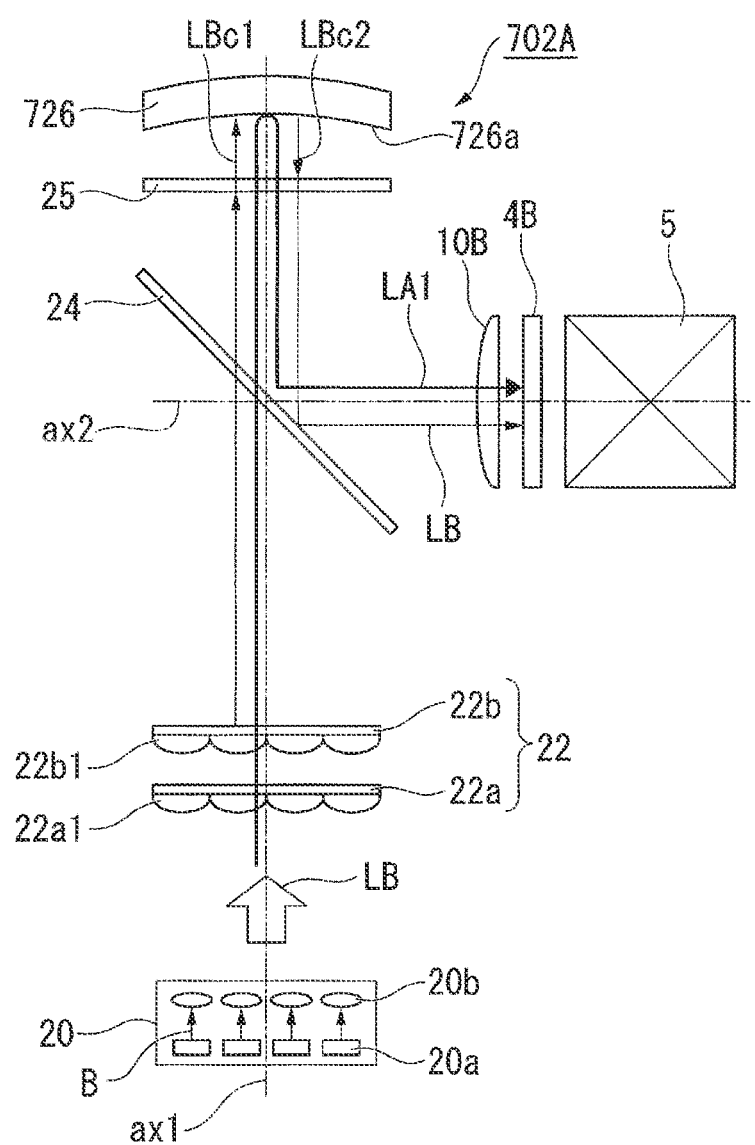
FIG. 10 shows a schematic configuration of a first illuminator in a seventh embodiment.

FIG. 10 shows a schematic configuration of the first illuminator of the projector according to the present embodiment. In the present embodiment, configurations common to those in the first embodiment have the same reference characters and will not be described in detail.

A first illuminator 702A in the present embodiment includes the first light source 20, the lens integrator unit 22, the polarization separation mirror 24, the retardation film 25, and a mirror (first reflector) 726, as shown in FIG. 10.

The mirror 726 in the present embodiment is formed, for example, of a concave mirror. A concave surface 726a of the mirror 726 is formed of an aspheric surface. That is, the mirror 726 can reflect the blue light LBc1 with the blue light LBc1 being convergent and aberrations produced therein suppressed when deflecting back the optical path of the blue light LBc1 in the opposite direction.

According to the first illuminator 702A in the present embodiment, the mirror 726 formed of the concave mirror having the aspheric concave surface 726a can be used as a substitute of the superimposing lens. That is, the first illuminator 702A in the present embodiment, which uses the mirror 726, allows omission of the superimposing lens 23 from the configuration in the first embodiment.

As described above, the first illuminator 702A in the present embodiment, in which the superimposing lens 23 is omitted, allows reduction in the size and cost of the apparatus configuration of the projector. The projector including the first illuminator 702A in the present embodiment therefore also allows further reduction in the size and cost of the projector.

The present disclosure is not limited to the configurations of the embodiments described above but can be changed as appropriate to the extent that the change does not depart from the substance of the present disclosure.

What is claimed is:

1. A projector comprising:
a first light source;
a first light modulator on which first light is incident;
a first polarization separator disposed on a first optical path along which the first light emitted from the first light source and entering the first light modulator travels;
a first retardation film disposed on the first optical path;
a first reflector disposed on the first optical path; and
a second light modulator on which second light different from the first light is incident,
wherein the first optical path passes through the first polarization separator and the first retardation film, is then deflected back by the first reflector, again through the first retardation film and the first polarization separator, and then reaching the first light modulator, and
a second optical path along which the second light travels is independent of the first optical path and does not intersect the first optical path.

2. The projector according to claim 1, further comprising:
a second retardation film disposed on the first optical path; and
a second reflector disposed on the first optical path,
wherein on a downstream of the first retardation film and the first polarization separator, the first optical path passes through the second retardation film, is then deflected back again by the second reflector, and reaches the first light modulator via the second retardation film and the first polarization separator.

3. The projector according to claim 2, further comprising an afocal system configured to reduce a light flux diameter of light emitted from the first light source,
wherein the afocal system includes a first lens and a second lens which are disposed on the first optical path; and
the first polarization separator, the first retardation film, the first reflector, the second retardation film, and the second reflector are disposed on the first optical path between the first lens and the second lens.

4. The projector according to claim 1, further comprising an afocal system configured to reduce a light flux diameter of light emitted from the first light source,
wherein the afocal system includes a first lens and a second lens which are disposed on the first optical path, and
the first polarization separator, the first retardation film, and the first reflector are disposed on the first optical path between the first lens and the second lens.

5. The projector according to claim 1, further comprising:
a second light source;
a wavelength converter that is excited with excitation light emitted from the second light source to produce wavelength-converted light;
a color separator configured to separate the wavelength-converted light emitted from the wavelength converter into the second light and third light; and
a third light modulator on which the third light is incident,
wherein the second light separated from the wavelength-converted light travels via the second optical path and is incident on the second light modulator, and
the third light separated from the wavelength-converted light is incident on the third light modulator.

6. The projector according to claim 1, further comprising:
a second light source;
a second polarization separator disposed on the second optical path along which the second light emitted from the second light source and entering the second light modulator travels;
a second retardation film disposed on the second optical path;
a second reflector disposed on the second optical path;
a third light source;
a third light modulator on which third light different from the first light and the second light is incident;
a third polarization separator disposed on a third optical path along which the third light emitted from the third light source and entering the third light modulator travels;
a third retardation film disposed on the third optical path; and
a third reflector disposed on the third optical path,
wherein the second optical path passes through the second polarization separator and the second retardation film, is then deflected back by the third reflector, and reaches the second light modulator via the second retardation film and the second polarization separator,
the third optical path passes through the third polarization separator and the fourth retardation film, is then deflected back by the third reflector, and reaches the third light modulator via the third retardation film and the third polarization separator, and
the third optical path is independent of each of the first optical path and the second optical path and does not intersect each of the first optical path and the second optical path.

7. The projector according to claim 1,
wherein the first reflector is a concave mirror.

8. The projector according to claim 7,
wherein a concave surface of the concave mirror is an aspheric surface.

* * * * *